June 20, 1961  D. H. EISENLOHR  2,989,571
HALOGENATION PROCESS
Filed May 2, 1958
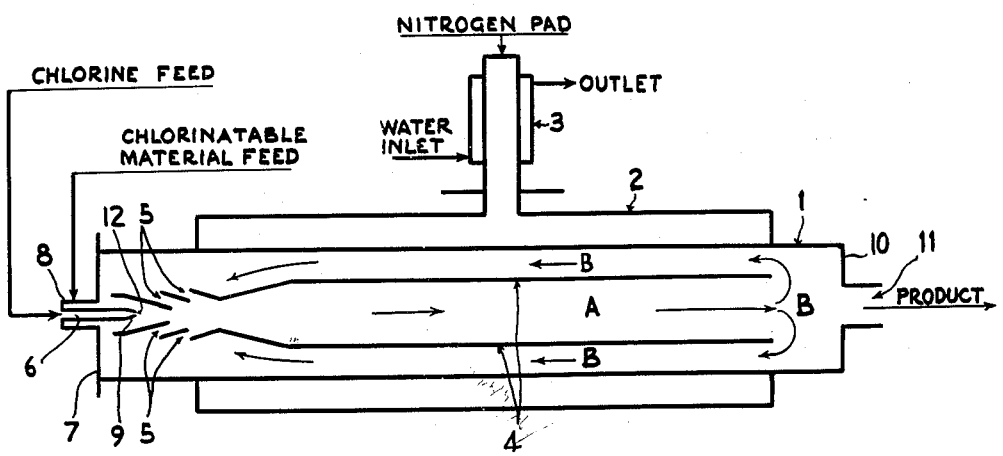
INVENTOR.
DOUGLAS H. EISENLOHR
BY Oscar L. Spencer
ATTORNEY ial Office 2,989,571
Patented June 20, 1961

1

2,989,571
HALOGENATION PROCESS
Douglas H. Eisenlohr, Barberton, Ohio, assignor, by mesne assignments, to Pittsburgh Plate Glass Company
Filed May 2, 1958, Ser. No. 732,595
14 Claims. (Cl. 260—664)

This invention deals with the manufacture of halogenated hydrocarbons, notably chlorinated aliphatic hydrocarbons of 1 to 6 carbon atoms. It is especially relevant to the manufacture of chlorinated methanes by gas phase reaction of chlorine and methane or partially chlorinated methanes.

One of the methods for obtaining chlorinated methanes (carbon tetrachloride, chloroform, methylene chloride and methyl chloride) is by gas phase reaction of methane or lower chlorinated methane and elemental chlorine. Although chemically the reaction appears straightforward, effective performance is not necessarily of comparable simplicity. For example, gaseous mixtures of methane and chlorine having high chlorine concentrations, e.g., in excess of 20 percent by weight chlorine, may be hazardous, being prone to be explosive or burn violently. This may dictate conducting the chlorination in gaseous mixture of low chlorine content or otherwise safeguarding against such hazards.

Dilution of the gaseous reaction mixture is one possibility. Even then, selection and use of appropriate diluent respecting suitable control of the reaction has its limitations.

As an illustration, the use of a portion of the reaction product composition (or other source of such materials) as diluent is not without operational inconveniences and economic disadvantages. Providing such diluent, for example, involves its separation from the entire product composition, as by rectification (fractional distillation). Rectification includes condensation and vaporization steps. Diluent obtained by this separation in liquid state eventually must be vaporized. On the other hand, should diluent be separated in a gaseous state, large volumes of gases necessarily must be recycled. Either situation poses less than highly economical limitations.

Further complicating use of diluents is the influence of the diluent (chemical composition) on the reaction. Depending upon the particular products which are desired, it may be advisable to control the chemical composition of the field if operation at optimum efficiency such as with minimized by-product formation, avoidance of excessive methane loss due to burning and the like.

Another significant consideration for a highly effective methane chlorination process is that it be flexible and thus capable of producing in varying ratios the various chlorinated methanes. Notwithstanding that all chlorinated methanes are commercial products, demands for each vary. A suitable process should preferably be sufficiently flexible to permit production of chlorinated methanes in accord with demand. Should the character of the diluent influence materially effective chlorination and the products of chlorination, operational flexibility pursuant to demand variations may necessitate a corresponding change in the character of the diluent. To provide for appropriate diluent in such circumstances, it may be necessary to

2 modify the product recovery system, a change not always easily accomplished.

Similarly, halogenations of other hydrocarbons or partially halogenated hydrocarbons to produce halogenated hydrocarbons involve similar considerations.

It now has been discovered that for many purposes the composition of diluent for the gas phase chlorination of hydrocarbons, notably for gas phase chlorination of methane to produce chlorinated methanes, preferably should have a chemical composition approximately corresponding to the reaction composition provided as a consequence of the chlorination, including by-products such as hydrogen chloride. This diluent should preferably comprise a major constituent, i.e., above 50 percent by volume and ideally at least about 70 percent by volume, of the gaseous reaction mixture. Further desirable is performance of the reaction in a gas mixture containing a substantial halogen, preferably chlorine concentration without the risk of establishing hazardous conditions.

In accordance with this invention, there is provided a process whereby one or more of the above described beneficial reaction conditions may be established in a simple efficient manner. The process facilitates, among other things, chlorination of chlorinatable materials with a particularly effective diluent and at safe yet desirable high concentrations of chlorine. The process further offers flexibility of operation, permitting manufacture of different product compositions without serious disruption of the manufacturing operation.

Now it has been found that the preparation of chlorinated hydrocarbons by gas phase chlorination of a chlorinatable material may be accomplished efficiently by providing a reaction zone maintained at chlorination temperature and establishing within the zone a moving gas stream flowing in a cyclic path while avoiding substantial movement of gases in the reactor contrary to the cyclic path of this moving stream, such as by physically separating countercurrently moving portions of the stream. Chlorine and the material to be chlorinated are added separately to this moving stream and a portion of the moving stream is withdrawn as product from the reaction zone at a point in the path of the stream remote from the points where the reactants are added. A remaining portion of the stream without removal from the reaction zone continues in the prescribed cyclic path, thereby constituting the principal component of the moving gas stream to which reactants are added and in which the chlorination is effected. Thus, diluent for the reaction (the moving gas stream) is generated in situ, e.g., in the reaction zone and by the chlorination reaction.

It will be understood that in the performance of such process temperatures and other operational conditions may be varied, depending upon the materials to be chlorinated and the desired chlorinated products. It is, furthermore, preferable to operate the chlorination by so correlating the diluent or portion of the stream which continues in the cyclic path that it comprises between about 5 and 30 times the volume of the chlorine feed which is fed thereto. This degree of dilution is the consequence of increasing the rate at which the stream traverses its cyclic path relative to the volume of chlorine which is fed per unit of time. A further important preferable feature of the method here is establishing a pressure differential in the gas stream between two points in its cyclic path which causes or implements the cyclic movement of the gas stream.

The process here contemplated may be performed by recourse to various reactors designed to establish the hereinabove described procedural conditions. Such apparatus may take various forms. A diagrammatic cross-sectional view of a particularly effective apparatus of exemplary simplicity is illustrated in the drawing.

The apparatus includes cylindrical tube 1 having most of its outer surface surrounded by heating or cooling jacket 2 containing a circulating high temperature liquid heat transfer medium such as Dowtherm (diphenyl-diphenylene oxide mixture). Temperature control of the liquid heat transfer medium in jacket 2 is provided by refluxing its vapors in water cooled condenser 3. Located within reactor 1 and disposed concentrically therein with respect to the longitudinal axis of reactor 1 is tube 4. Tube 4 thus divides the reaction zone and reactor 1 into two principal sections, the first section A being within tube 4 and the second, section B, provided by the annulus between tube 4 and the outer walls of reactor 1 as well as the area not enclosed by tube 4. At the inlet end of reactor 1 (at the left in the drawing) tube 4 tapers inwardly toward the inlet end of the reactor and terminates in a series of throats 5. Tube 6 of substantially smaller diameter than tube 4 and concentric with the longitudinal axis of reactor 1 passes through nipple 8 and end wall 7 of the reactor into reactor 1, finally terminating in a jet 9. This is the means whereby chlorine is fed through feed tube 6 and jetted into tube 4 at a point 12 in tube 4 surrounded by throats 5.

Hydrocarbon feed means comprises the annulus defined by the volume between feed tube 6 and nipple 8 which opens into reactor 1. This provides for feeding hydrocarbon (or material to be chlorinated) into the reactor separately from the chlorine. The hydrocarbon thus enters through nipple 8 into the gas mixture in zone B of the reactor outside of tube 4.

End walls 7 and 10 terminate reactor 1. Chlorine feed means 6 and hydrocarbon feed means 8 pass through end wall 7. Product withdrawal means 11 pass through end wall 10.

By virtue of the particular reactor design illustrated in the drawing, chlorination is most efficient and proceeds with surprising ease. Thus, elemental chlorine, notably gaseous chlorine, is jetted into tube 4 via feed means tube 6 and jet 9. By this jetting action, gaseous mixture in section B of the reactor circulates (is drawn) into tube 4 through throats 5 and is mixed there with chlorine. The hydrocarbon feed, introduced through nipple 8 into section B near throats 5 mixes with the gases in section B. Direct mixing of the hydrocarbon and feed chlorine is thus prevented, avoiding risk of chlorine-hydrocarbon mixtures which may be hazardous.

Established by this reactor and feeding technique in tube 4 is a forwardly flowing stream in section A of the reaction zone. This stream, as it is initially constituted, includes chlorine, hydrocarbon and a recycle of gaseous mixture discharged from tube 4 into zone B (as hereinafter explained further). As this gaseous reaction mixture discharges from tube 4, gaseous mixture continues to be drawn through throats 5 into section A in tube 4, and a major portion of the gas stream discharging from section A into section B of the reaction zone is returned to tube 4. The net result in a flow of gases (as indicated by the arrows) in section B countercurrent to the flow of gases in section A and tube 4. The gaseous mixture in reactor 1 and sections A and B thus move in a cyclic repetitive path with countercurrent portions of the path being separated by the walls of tube 4 to prevent substantial flow of gaseous mixture contrary to the principal cyclic path of flow. Product is withdrawn through removal tube 11, usually with the volume of product removal corresponding to the volume of chlorine and hydrocarbon being fed.

In the preferred operation of this reactor for chlorination, conditions are provided which develop a slight pressure differential between the gases in section A and section B, preferably with the pressure in section A exceeding that of section B. The effect generated by jetting chlorine into section A and throats 5, especially as when the chlorine is fed at 0.5 to 100 pounds per square inch gauge pressure develop such pressure differential. It is to be understood that the pressures in sections A and B in reactor 1 may vary considerably, including subatmospheric and superatmospheric pressures. Illustrative pressures in the reactor are between atmospheric and 100 pounds per square inch gauge. The maximum pressure differential between section A and section B (lowest pressure in section B and highest pressure in section A) usually is no greater than about 10 pounds per square inch, mainly ranging between 0.001 and 1 pound per square inch gauge.

Also in chlorinating with this reactor, the volume of gases being drawn into tube 4 and section A from section B is usually 5 to 50 times the volume of the chlorine jetted into tube 4 (section A) for most chlorinations. Thus, the gases recycled and used to dilute the chlorine constitute by far the predominant portion of the gas reaction mixture.

Most chlorinations involve greater volumes of chlorine than hydrocarbon feed. Best rates of recycle are attained by jetting the feed material which is greatest in volume, usually chlorine. However, should the hydrocarbon feed be at a greater volume rate than the chlorine feed, or should it be otherwise expedient, the hydrocarbon may be fed through feed means 6 and the chlorine fed through nipple 8. Thus, while in the preferred mode of operation gaseous elemental chlorine is jetted into tube 4 and the hydrocarbon is fed into and mixed with the gas mixture in section B, the reverse may be practiced. Also, both feeds may be jetted.

For many of these chlorinations an appreciable chlorine concentration is maintained in the gas reaction mixture, both in sections A and B of the reaction zone. For example, in the chlorination of methane or partially chlorinated methanes, the chlorine concentration may be as high as 15 or 18 percent by weight of the gas mixture in section A. In that portion of section A immediately after the chlorine is mixed with the gas mixture drawn in from section B, the chlorine concentration is maximum. As the gas stream proceeds in its path of movement in section A, this chlorine concentration drops as chlorination occurs. Since chlorination, in the preferred process, occurs throughout the reactor, the chlorine concentration continues to drop in section B due to continuing reaction taking place. Thus, throughout its movement in a cyclic path, the gas stream experiences a gradual decline in chlorine concentration from a maximum at the point of chlorine introduction to a minimum at the point in the cyclic path immediately prior to the addition of feed chlorine. Where hydrocarbon is introduced into the stream which may be spaced considerably from the point of chlorine feed (spaced with reference to the cyclic path of the stream) some dilution occurs in the chlorine concentration. In most reactions, the effect of this dilution does not significantly change the chlorine concentration, or as in the performance of the reaction in the illustrated reactor, the point of hydrocarbon feed is essentially immediately prior to the point of chlorine feed. Thus, there is a continuing drop in chlorine concentration along the cyclic path defined by the movement of the gas stream in the reactor.

The maximum chlorine concentration may be as high as 50 percent by weight. The minimum chlorine concentration in one preferred embodiment usually is in excess of 5 percent chlorine by weight of the gaseous mixture and, notably, is at least 8 percent chlorine by weight. This is especially true in the chlorination of lower aliphatic hydrocarbons such as methane, ethane, propanes and butanes or their partially chlorinated derivatives. Thus, optimum chlorine concentrations when preferable may vary, depending upon the specific chlorination.

This process is admirably suited for controlling the chlorine concentration in the moving cyclic gas stream in accordance with the preferences of any particular chlorination reaction. For the chlorination of methane, it has usually been found advantageous to maintain the maximum chlorine concentration on the order of 12 to 15 percent chlorine by weight of the gaseous mixture; this concentration being established at the point the chlorine feed is commingled with the gas mixture enriched with hydrocarbon feed as it enters the reaction section A. The gas mixture is discharged from section A into section B and as it leaves tube 4 usually at chlorine concentration several percent less, e.g., 10 to 12 percent chlorine by weight, while the chlorine concentration in section B prior to the mixing therewith of hydrocarbon feed and introduction through throats 5 into tube 4 is still several percent lower, notably in the range of 6 to 8 percent chlorine by weight.

In those chlorinations such as methane chlorination preferably conducted in the presence of a substantial chlorine concentration in the reaction gases, the product gas composition withdrawn at 11 contains a substantial chlorine concentration corresponding approximately to the chlorine concentration of the gaseous mixture being discharged from tube A into zone B or corresponding in effect to the average chlorine concentration in section B of the reactor. According to a further embodiment of this invention, the chlorine in the gaseous product mixture withdrawn from the reactor is consumed in a further chlorination. It usually is fed to a further zone at chlorination temperature. In this further reaction zone or zones, the reaction is carried to completion in the sense that most or all of the residual chlorine present is consumed in conducting further chlorination.

Besides its simplicity, the aforedescribed process as conducted in the type of reactor illustrated in the drawing has many distinctive features. It does not require premixing the chlorine and hydrocarbon feed prior to entry into the reaction zone, thus avoiding any possibility of hazardous chlorine and methane mixture. It is further distinctive in utilizing as diluent, or principal component of the gas reaction medium, a gaseous mixture having a composition corresponding to the product composition the process is specifically operated to provide. Since often the entire gaseous product mixture is an exemplary diluent, the diluent (or reaction medium) is generated in situ and directly available as generated for use as diluent, thereby circumventing complicating problems of rectifying the gaseous reaction product composition and recycling portions. The flexibility of the procedural steps in being self-adjusting (flexible) to operational conditions best suited for producing varying products is most evident.

Further features include requiring only the introduction to the reactor of chlorine and the material to be chlorinated. Diluent or other materials need not be fed to the reactor. Circumvented is any need for diluting the respective feed materials, notably the chlorine and chlorinated materials, prior to their introduction into the reactor. They may instead be directly and separately fed to the reactor.

The following examples illustrate the manner in which the present invention may be performed.

EXAMPLE I

The reactor in this example is of the type illustrated in the drawing. It includes a cylindrical nickel tube 5 feet long and 4 inches in internal diameter sealed at one end except for an outlet nickel pipe 2 inches in diameter and concentric with the longitudinal axis of the main reactor tube. This reactor tube was jacketed with a tube 4 feet long and 6 inches in diameter. The inlet end of the reactor tube was sealed with a 4 inch nickel flange. Welded to this nickel flange was a 1 inch diameter nickel pipe-T, concentric with the major longitudinal axis of the reactor. The T was assembled so that the hydrocarbon could be fed to the reactor in the annulus around the pipe opening up into the reactor and the annulus around the inlet to the jackets.

The chlorine feed means comprise a ⅜ inch diameter pipe concentrically disposed around a longitudinal axis of the reactor, passing through the nickel T and flange, terminating in a jet outlet surrounded by throats. The jet assembly contained a jet and three throats which jet assembly terminated in a tube 4 feet long and 2⅝ inches diameter disposed in the axial center of the reactor. In these experiments, the gaseous chlorine was preheated by passage in heat exchange relationship with the Dowtherm in the reactor jacket. This means the chlorine gas was at about the temperature of the Dowtherm. Chlorinatable feed material was introduced at 70° F. to the reactor. Chlorine was fed at 0.5 to 15 pounds per square inch gauge pressure and the chlorinatable material was fed at atmospheric pressure. The methane was fed at 70° F.

The gaseous product mixture discharged from this reactor was led into a further reaction zone maintained at appropriate chlorination temperature. The reaction zone was provided by a Dowtherm A jacketed reactor 2 inches in diameter and 6 feet long. Reaction of the residual chlorine was effected there.

From this second reactor the gaseous reaction mixture was fed to a shower pipe provided by a column of pipe having four sections. At the bottom, it has a 4 inch diameter sump with an inlet pipe from the second reactor and a product overflow line with liquid seal. Immediately above this section is a 4 inch diameter, 24 inch high packed section and a tube and shell water-cooled condenser sets on top of the packed section. The top section is a 4 inch diameter pipe containing a cold thimble filled with Dry Ice-acetone. Thus, the gas emanating from the second reactor were partially condensed by the downwardly flowing stream of liquids condensed in the upper section, serving primarily to condense the organic components, notably the chlorinated hydrocarbon, while some traces of the lights of mostly methyl chloride or methane and hydrogen chloride pass overhead of gases. The water cooled condenser section removes most of the sensible heat with reflux and condenses about ⅔ of the product while the cold thimble reduces the dew point so that vent hydrogen chloride contains only small traces of methyl chloride and methylene chloride. The overhead gases, mostly hydrogen chloride, were led to a hydrogen chloride absorber, a water cooled packed 2 inch glass pipe and then to a caustic scrubber comprised of a 2 inch glass pipe packed with ½ inch Berl saddles. Bottoms from the shower pipe were collected as product.

In operation, this reactor was employed by first heating with Dowtherm (diphenylene-diphenylene oxide mixture) overnight while setting the temperature of the Dowtherm by control of the nitrogen pad pressure. Nitrogen was fed to purge the system and thereafter feed of hydrocarbon was commenced, following which chlorine feed was started. As soon as the hydrocarbon feed and chlorine were regulated properly, Dry Ice and acetone were placed in the cold thimble of the shower pipe. Product (bottoms) from the shower pipe was in each of the runs weighed and sampled. After thoroughly washing this sample with water and sodium carbonate, following which the sample was dried by filtration through the soda ash. Chromatographic analyses of the products were then obtained.

Following the above procedure, using methane or methyl chloride as the hydrocarbon feed and chlorine as the chlorinating agent, the chlorination to provide higher chlorinated methane and methyl chloride was performed in a plurality of runs. The following Table I lists the operational data and experimental data:

Table I

| | | | | |
|---|---|---|---|---|
| Dowtherm Temperature, °F | 675 | 675 | 675 | 675 |
| Recycle Reactor Temperature, °F | 677 | 683 | 684 | 684 |
| Soaking Reactor Temperature, °F | 665-670 | 665-670 | 670-675 | 663-667 |
| Hydrocarbon Feed | $CH_3Cl$ | $CH_3Cl$ | $CH_3Cl$ | $CH_4$ |
| Operating Time of Run, hours | 5.5 | 7.75 | 7.5 | 5.0 |
| Moles $Cl_2$ Per Mole Hydrocarbon | 2.13 | 2.13 | 1.675 | |
| Hydrocarbon Feed, pounds per hour | 0.636 | 0.71 | 0.934 | |
| Chlorine Feed, pounds per hour | 1.91 | 2.13 | 2.2 | 2.1 |
| Product, pounds per hour | 1.127 | 1.635 | 1.683 | 0.862 |
| Retention Time, seconds: | | | | |
|   Recycle Reactor | 3.55 | 3.18 | 3.08 | 3.55 |
|   Soaking Reactor | 19.2 | 17.2 | 15.3 | [1] 20 |
| Unreacted Chlorine Concentration, percent by weight of the mixture: | | | | |
|   Recycle Reactor | 11.2 | 14.3 | 12.6 | 14.1 |
|   Soaking Reactor (second) | 2.1 | 2.1 | 2.1 | 3.3 |
| Products, mole percent of chlorinated products: | | | | |
|   Carbon Tetrachloride | 74.3 | 51.2 | 50.9 | 96.3 |
|   Methyl Chloride | 0.1 | 0.2 | 0.3 | Trace |
|   Methylene Chloride | 4.7 | 10.8 | 1.7 | 1.4 |
|   Chloroform | 20.2 | 37.7 | 46.9 | 1.6 |
|   1,1-Dichloroethane | 0.6 | Trace | Nil | Trace |
|   Heavies | Trace | Trace | Trace | 0.6 |
| Yields Based On: | | | | |
|   Hydrocarbon Feed, percent of feed | 62.3 | 87.9 | 66.9 | |
|   Chlorine Feed, percent of feed | 78.8 | 99.0 | 99.1 | 75.3 |

[1] Approximately.

In the above runs of Example I, the jet of chlorine through the throats resulted in recycling about 20 volumes of the product reaction mixture plus hydrocarbon per volume of the chlorine introduced into the reactor. This ratio of recyclevolume to chlorine feed volume is based upon a calibration with air fed to the jet. Anemometer readings were obtained for the jet alone and for the jet in the reactor at pressures on the jet of 0.5 to 70 p.s.i.g. The ratio is the volume of gas issued by the inner chamber A versus the volume of gas issued by the jet. It will be understood that those operational details described in terms of volume recycle are based upon such reference measurement.

EXAMPLE II

The reactor and procedure described in Example I were employed feeding 1,1-dichloroethane as the chlorinattable organic material primarily to provide trichloroethanes and predominantly 1,1,1-trichloroethane. The following Table II tabulates the operational data and results of several runs:

Table II

| | | | | |
|---|---|---|---|---|
| Dowtherm Temperature, °F | 695 | 650 | 625 | 625 |
| Recycle Reactor Temperature, °F | | 630 | 603 | 601 |
| Soaking Reactor Temperature, °F | 693 | 638 | 607 | 609 |
| Operating Time, hours | 5.5 | 7.5 | 6.0 | 4.5 |
| Moles of $Cl_2$ Per Mole $C_2H_4Cl_2$ | 0.456 | 0.697 | 0.697 | 0.561 |
| $C_2H_4Cl_2$, pounds per hour | 3.27 | 4.0 | 3.0 | 4.0 |
| $Cl_2$, pounds per hour | 1.0 | 2.0 | 1.5 | 1.61 |
| Product, pounds per hour | | 4.61 | 2.77 | 4.34 |
| Retention Time, seconds: | | | | |
|   Recycle Reactor | | 3.2 | 4.4 | 2.7 |
|   Soaking Reactor | 8.7 | 11.4 | 15.5 | 13.6 |
| Unreacted Chlorine Concentration, percent by weight of reaction mixture: | | | | |
|   Recycle Reactor Outlet | | 17.0 | 16.0 | |
|   Soaking Reactor Outlet | | 1.5 | 2.1 | |
| Products, mole percent of chlorinated products: | | | | |
|   1,1-$C_2H_4Cl_2$ | 53.7 | 31.4 | 32.7 | 37.6 |
|   1,1,1-$C_2H_3Cl_3$ | 18.2 | 38.3 | 38.5 | 38.2 |
|   1,2-$C_2H_4Cl_2$ | 1.7 | 2.2 | 2.9 | 1.4 |
|   1,1,2-$C_2H_3Cl_3$ | 8.2 | 11.9 | 14.3 | 9.9 |
|   1,1,1,2-$C_2H_2Cl_4$ | 1.2 | 6.0 | 6.4 | 5.8 |
|   1,1,2,2-$C_2H_2Cl_4$ | Trace | Trace | Trace | Trace |
|   Miscellaneous Impurities | 17.0 | 10.2 | 5.2 | 7.1 |

As should be clear from the foregoing description of detailed embodiments, the present invention has general applicability to a wide variety of gas phase chlorination processes and hence to the chlorination of chlorinatable materials broadly. Thus, while the process is particularly effective and most efficient with regard to substitution chlorinations, its principles are beneficial when applied to performance of additive chlorinations as well as effective both to additive and substitution chlorinations. Besides chlorinations, halogenations, notably bromination, chlorination and iodination, or even mixed halogenation, say chlorination-fluorination, may be accomplished according to the principles of this invention.

The process is ideally suited to gas phase chlorinations of chlorinatable organic materials exemplified by aliphatic compounds containing from 1 to 6 carbon atoms and at least 1 hydrogen atom available for substitution chlorination. Used mostly are lower aliphatic hydrocarbons (1 to 6 carbon atoms); methane, ethane, propane, isopropane, the butanes, the pentanes, longer chain hydrocarbons and mixtures thereof as well as their partially chlorinated derivatives such as methyl chloride, methylene chloride, chloroform, monochloroethane, 1,2-dichloroethane, 1,1-dichloroethane, 1,1,1-trichloroethane, 1,1,2-trichloroethane, 1,1,2,2-tetrachloroethane, 1,1,1,2-tetrachloroethane and pentachloroethane as well as corresponding partially chlorinated derivatives of other hydrocarbons and mixtures of one or more of any such chlorinatable materials. Also chlorinatable are the unsaturated hydrocarbons such as acetylene, ethylene, 1,2-butylene and the like. Thus, the process is of value in the chlorination of materials which in the gas phase may be chlorinated both by addition and substitution. Besides the afore-enumerated chlorinatable materials, other chlorinatable organics, particularly those chlorinatable by substitution chlorination, may comprise a significant, preferably principal, portion or even all of the chlorinatable feed. Corresponding partially brominated, even fluorinated or otherwise halogenated (including mixed halogenated, e.g., chlorofluoro materials) are included.

Gas phase halogenations, especially chlorinations, of still other organics are performed using the process here described. Benzene, substituted benzenes such as phenols, xylenes, and other aromatics such as naphthalene and alkylated naphthalenes, may be halogenated. Either nuclear or ring halogenation and/or halogenation of halogenatable ring substituents are possible, e.g., aralkyls such as ethylbenzene may have the ethyl and/or ring chlorinated. Also included are cycloaliphatics such as cyclopentane, cyclohexane, cyclopentene, cyclopentadiene and the like. Similarly, the partially halogenated derivatives of aromatic, aralkyl and cycloaliphatics may be more fully halogenated.

As the diversity of halogenations which may be performed indicates, the process may be operated with extreme flexibility. For example and with reference to the specific reactor, the jacket may serve either to cool or to heat the reaction mixture. It is thus possible to perform reactions under essentially isothermal conditions.

Temperatures developed in the reactor are those which are well recognized for the proper chlorination of the material to obtain the desired product or products. Thus, in the chlorination of methane to produce a reaction mixture predominating in carbon tetrachloride, the temperatures are between 500° F. and 900° F. When the principal product desired from methane is methyl chloride, somewhat different temperatures, 700° F. to 800° F., are more optimum. In the case of ethane chlorination to produce product compositions principally comprised of 1,1-dichloroethane, the temperatures are on the order of 500° F. to 700° F. Furthermore, when the chlorinatable material is a partially chlorinated product such as methyl chloride, some variation in the optimum temperature is also possible. For example, in the chlorination of 1,1-dichloroethane to produce a reaction mixture predominantly of trichloroethane, the principal component of which is 1,1,1-dichloroethane, temperatures between 500° F. and 700° F. are used with success.

The ratio in which the material to be chlorinated and chlorine, either gaseous or liquid, are fed to the reactor is in part determined by the product or products sought. If carbon tetrachloride is to be the principal product from methane, the ratio should be approximately 2 to 4 moles of chlorine per mole of methane. Correspondingly, the mole ratio to chlorinatable materials is adjusted when the product contains less chlorine than carbon tetrachloride. For example, when chloroform is desired from methane, the mole ratio of chlorine to methane is lower, generally averaging less than 2 to 1. A certain portion of the methane may be unchlorinated.

Recovery and separation of product or products from the gaseous composition produced (besides further reaction of the residual chlorine) may involve selective condensation of the organic constituents of the gaseous composition following which the liquid mixture of the chlorinated products may be rectified by recourse to appropriate distillation techniques. It may further be advisable to treat the chlorinated organics with small amounts of alkali such as sodium carbonate, sodium hydroxide or the like to neutralize small quantities of acid, notably hydrochloric acid, which remain. Many chlorinated organics, particularly the chlorinated aliphatic hydrocarbons of 1 to 6 carbon atoms, are capable of dissolving very small but, nevertheless, finite amounts of water. If removal of all or a significant portion of this water is advisable, it may be accomplished by drying the chlorinated organics by the use of drying agents such as calcium chloride.

While the present invention has been described by reference to specific details of certain embodiments, it is not intended that the invention be construed as limited to such details except insofar as they are incorporated in the appended claims.

I claim:

1. In a method of manufacturing halogenated hydrocarbons by the gas phase halogenation of halogenatable organic materials with elemental halogen, the improvement which comprises conducting the halogenation in a reaction zone maintained at a gas phase halogenation temperature and having a first and second section, introducing elemental halogen into the first section, adding the organic material to be halogenated to the gases at halogenation temperature in the second section thereby diluting the halogenatable material with gases in the second section, mixing and diluting in the first section the chlorine with gas mixture at halogenation temperature supplied from the second section, discharging the gas mixture from the first section into the second section thus providing for the gaseous mixture in the second section which is supplied to the first section and withdrawing from a location in the second section of the reaction zone remote from where said organic material is added a portion of the gas mixture.

2. In a method of manufacturing chlorinated hydrocarbons by the gas phase chlorination of chlorinatable organic materials with elemental chlorine, the improvement which comprises conducting the chlorination in a reaction zone maintained at a gas phase chlorination temperature and having a first and second section, introducing elemental chlorine into the first section, adding the organic material to be chlorinated to the gases at chlorination temperature in the second section thereby diluting the chlorinatable material with gases in the second section, mixing in the first section the chlorine with the gas mixture at chlorination temperature from the second section, discharging the gas mixture leaving the first section into an area of the second section spaced from where the chlorine is introduced whereby the discharge provides for the gas mixture in the second section to which the chlorinated material is supplied and which is added to the first section and withdrawing from a location in the second section of the reaction zone remote from where said organic material is added a portion of the gas mixture.

3. In a method of manufacturing chlorinated hydrocarbons by the gas phase chlorination of elemental chlorine and a chlorinatable organic material, the improvement which comprises conducting the chlorination in a reaction zone maintained at a gas phase chlorination temperature and having a first and second section, said second section surrounding the first section of the reaction zone, introducing elemental chlorine into the first section, adding the organic material to be chlorinated to the gases at chlorination temperature in the second section thereby diluting the chlorinatable material with gases in the second section, mixing gas mixture at chlorination temperature from the second section with the chlorine in the first section, discharging the gas mixture leaving the first section into an area of the second section spaced from where the chlorine is introduced whereby the discharge provides for the gas mixture in the second section to which the material to be chlorinated and which is added to the first section, and withdrawing a portion of the gas mixture from a location in the second section remote from where said organic material is added.

4. In a method of manufacturing chlorinated hydrocarbons by gas phase chlorination with elemental chlorine and a chlorinatable organic material, the improvement which comprises conducting the chlorination in a reaction zone maintained at a gas phase chlorination temperature and having a first and second section, said second section surrounding the first section, introducing elemental chlorine into the first section, adding the organic material to be chlorinated to the gaseous mixture at chlorination temperature in the second section thereby diluting the chlorinatable material with gases in the second section, mixing in the first section the resulting gas composition at chlorination temperature with chlorine, maintaining the pressure in the first section greater than in the second section, discharging the gas mixture from the first section into an area of the second section spaced from where the chlorine is introduced, removing a portion of the gas mixture from a location in the second section remote from where said organic material is added as a product removal means while the remainder provides the gaseous mixture in the second section to which chlorinatable material is added and which is returned to the first section as diluent.

5. In a method of manufacturing chlorinated hydrocarbons by gas phase chlorination of chlorinatable organic material and elemental chlorine, the improvement which comprises conducting the chlorination in a reaction zone maintained at a gas phase chlorination temperature and having a first and second section, said second section surrounding the first section, introducing elemental chlorine in the first section, adding the organic material to be chlorinated to the gas mixture at chlorination temperature in the second section thereby diluting the chlorinatable material with gases in the second section, mixing at least 5 volumes of the resulting gas composition at chlorination temperature per volume of chlorine in the first section, maintaining the pressure in the first section greater than that of the second section, establishing in the first section a forwardly moving gas stream, discharging such gas stream from the first section into the second section, withdrawing a portion of the gaseous mixture in the second section and utilizing the remaining gas mixture for mixture with the material to be chlorinated and for addition to the first section for mixture and dilution of the chlorine.

6. In the method of manufacturing a chlorinated methane by gas phase chlorination of a chlorinatable methane having at least one hydrogen atom with chlorine, the improvement which comprises conducting the chlorination in a reaction zone maintained at a gas phase chlorination temperature and comprised of a first and second section, said second section disposed around and separated from the first section, jetting elemental chlorine into the first section, supplying chlorinatable methane to the contents at chlorination temperature of second section thereby diluting the chlorinatable methane with gases in the second section, mixing in the first section the resulting gas mixture at chlorination temperature with the chlorine, discharging the gaseous composition in the first section into the second section, withdrawing from the reactor a portion of the gases in the second section from a location therein remote from where the chlorinatable methane is supplied while the gases remaining in the second section provide for the mixture to which the chlorinated methane is supplied and which is added to the first section.

7. The method of claim 6 wherein the chlorinatable methane is methane.

8. The method of claim 6 wherein the chlorinatable methane is methyl chloride.

9. In a method of manufacturing a chlorinated methane by gas phase chlorination of a chlorinatable methane with elemental chlorine, the improvement which comprises conducting the chlorination in a reaction zone maintained at a gas phase chlorination temperature and having a first and second section, said second section disposed around and separated from the first section, jetting elemental chlorine into the first section, supplying to said first section and mixing with chlorine therein chlorinatable methane in a gas mixture at chlorination temperature including chlorinated methane and hydrogen chlorine, discharging the gases in the first section into the second section, withdrawing a portion of the gases in the second section from the section and reaction zone, and adding to the gases at chlorination temperature in the second section remote from the location where said gases are withdrawn chlorinatable methane whereby to provide the gaseous mixture fed to the first zone.

10. In a method of preparing in gaseous state a chlorinated hydrocarbon by gas phase chlorination of organic material to be chlorinated with elemental chlorine, the improvement which comprises providing a reaction zone maintained at a chlorination temperature above the normal boiling point of chlorinated hydrocarbon reaction products, establishing within the zone a moving gas stream at chlorination temperature flowing in a cyclic path, separating countercurrently moving portions of the stream to prevent substantial movement of gas opposite to the cyclic path of movement, adding separately elemental chlorine and the material to be chlorinated to spaced positions along the path of organic moving stream and withdrawing a portion of the moving gas stream from the reaction zone gas at a point in the stream's path remote from the points of reactants' addition while the remaining portion of the stream continues in a cyclic path thereby comprising a principal component of the moving gas stream to which reactants are added and in which chlorination takes place.

11. The method of claim 10 wherein the rate of recycle and rate of chlorine fed to the moving stream are regulated such that the stream to which chlorine is added is between 5 and 30 times the volume of chlorine fed thereto.

12. The method of claim 10 establishing a pressure differential in the moving gas stream between two points in the cyclic path.

13. The method of claim 10 wherein the components of the gas other than chlorine and chlorinated material are generated in the gas stream.

14. The method of claim 10 wherein a substantial chlorine concentration is maintained in the gas stream throughout its cyclic path, the maximum chlorine concentration being at the point of chlorine introduction to the gas stream.

References Cited in the file of this patent

UNITED STATES PATENTS

| 1,420,346 | Snelling | June 20, 1922 |
| 2,429,963 | Reitlinger | Oct. 28, 1947 |

FOREIGN PATENTS

| 952,168 | Germany | Nov. 15, 1956 |
| 789,314 | Great Britain | Jan. 22, 1958 |

UNITED STATES PATENT OFFICE
CERTIFICATE OF CORRECTION

Patent No. 2,989,571

June 20, 1961

Douglas H. Eisenlohr

It is hereby certified that error appears in the above numbered patent requiring correction and that the said Letters Patent should read as corrected below.

Column 3, line 65, for "in" read -- is --; column 6, line 10, for "nicket" read -- nickel --; line 48, for "whlie" read -- while --; column 12, line 7, for "the" read -- organic --; line 8, for "organic" read -- the --; line 10, before "gas" insert -- as a --.

Signed and sealed this 17th day of July 1962.

(SEAL)
Attest:

ERNEST W. SWIDER
Attesting Officer

DAVID L. LADD
Commissioner of Patents